(12) United States Patent
Liang et al.

(10) Patent No.: US 9,762,103 B2
(45) Date of Patent: Sep. 12, 2017

(54) BRUSH MOTOR

(71) Applicant: Johnson Electric S.A., Murten (CH)

(72) Inventors: Ji Yu Liang, Shenzhen (CN); Shu Hai Yuan, Shenzhen (CN); Xin Hui Guan, Shenzhen (CN)

(73) Assignee: JOHNSON ELECTRIC, S.A., Murten (CH)

( * ) Notice: Subject to any disclaimer, the term of this patent is extended or adjusted under 35 U.S.C. 154(b) by 260 days.

(21) Appl. No.: 14/747,540

(22) Filed: Jun. 23, 2015

(65) Prior Publication Data

US 2015/0372560 A1    Dec. 24, 2015

(30) Foreign Application Priority Data

Jun. 23, 2014   (CN) .................... 2014 2 0337835 U

(51) Int. Cl.
| | |
|---|---|
| *H02K 5/24* | (2006.01) |
| *H02K 13/00* | (2006.01) |
| *H02K 11/026* | (2016.01) |

(52) U.S. Cl.
CPC ............. *H02K 5/24* (2013.01); *H02K 11/026* (2013.01); *H02K 13/006* (2013.01)

(58) Field of Classification Search
CPC ....... H02K 5/24; H02K 11/026; H02K 13/006
USPC .......................................................... 310/71
See application file for complete search history.

(56) References Cited

U.S. PATENT DOCUMENTS

| | | | | | |
|---|---|---|---|---|---|
| 4,748,353 | A | * | 5/1988 | Klingenstein | H02K 23/66 200/1 V |
| 5,196,747 | A | * | 3/1993 | Kress | B25B 21/00 310/158 |
| 6,541,883 | B2 | * | 4/2003 | Uffelman | F04B 17/03 310/45 |
| 7,755,232 | B2 | * | 7/2010 | Winkler | H02K 11/026 310/51 |
| 8,294,328 | B2 | * | 10/2012 | Lau | H01R 39/383 310/239 |
| 8,421,317 | B2 | * | 4/2013 | Jiang | H02K 5/148 310/239 |
| 2005/0088054 | A1 | * | 4/2005 | Hartel | B60T 8/368 310/239 |
| 2013/0134811 | A1 | * | 5/2013 | Nuzzo | H02K 11/02 310/72 |
| 2015/0076946 | A1 | * | 3/2015 | Schoele | H02K 5/148 310/71 |

(Continued)

FOREIGN PATENT DOCUMENTS

JP    2005-354795 A    12/2005

*Primary Examiner* — Robert W Horn
(74) *Attorney, Agent, or Firm* — Muncy, Geissler, Olds & Lowe, P.C.

(57) ABSTRACT

A brush motor has a housing, an end cap and a brush assembly. The brush assembly includes an brush card, brush cages disposed on the brush card, brushes mounted in the respective brush cages, terminals for connecting with an external power supply, and power supply circuits connecting the terminals to the respective brushes. The brush assembly further includes at least one grounding conductor mounted to the brush card and electrically connected to the power supply circuits. The grounding conductor includes a main portion fixed to the brush card and a tongue extending from the main portion. The tongue includes a bent portion for resilient connection to the end cap or housing.

12 Claims, 7 Drawing Sheets

(56) References Cited

U.S. PATENT DOCUMENTS

| | | | | |
|---|---|---|---|---|
| 2015/0372560 A1* | 12/2015 | Liang | ............... | H02K 5/24 |
| | | | | 310/71 |
| 2015/0372569 A1* | 12/2015 | Lau | ............... | H02K 5/148 |
| | | | | 310/71 |
| 2015/0381019 A1* | 12/2015 | Qin | ............... | H02K 5/225 |
| | | | | 310/72 |

* cited by examiner ively. In the figures, identical

BRUSH MOTOR

CROSS REFERENCE TO RELATED APPLICATIONS

This non-provisional patent application claims priority under 35 U.S.C. §119(a) from Utility Model Application No. 201420337835.1 filed in The People's Republic of China on Jun. 23, 2014, the entire contents of which are hereby incorporated by reference.

FIELD OF THE INVENTION

This invention relates to electric motors and in particular, to a brush type motor having a grounding element.

BACKGROUND OF THE INVENTION

Permanent magnetic direct current (PMDC) brush motors are used in a variety of applications where it is desired to keep electromagnetic interference (EMI) to a minimum. Typically, the motor housing is grounded in order to decrease EMI transmission to surrounding electrical devices. Conventionally, a grounding wire is typically disposed on the brush assembly. One end of the grounding wire is electrically connected to a power supply circuit of the brushes, and the other end extends to a periphery of the insulating brush holder. During assembly, the brush assembly is disposed at an open end of the motor housing, and an end cap of the motor is then disposed on an outside of the brush assembly to be connected to a motor housing. In a traditional connecting method, portions of the open end of the housing are crimped or otherwise plastically deformed over the edge of the end cap to secure the end cap to the housing.

After assembly, the grounding wire on the brush assembly is axially sandwiched between the peripheral edge of the end cap and the peripheral edge of the motor housing so as to be electrically connected to the motor housing. One shortcoming of such configuration is that a slit is formed at the connecting area between the end cap and the motor housing due to the presence of the grounding wire. In addition, in order to securely sandwich the grounding wire to ensure the close contact of the grounding wire with the motor housing, the end cap presses against the grounding wire after the end cap is mounted. This may lead to deformation of the end cap, or even a failure of securely mounting the end cap. On the contrary, if the end cap does not press firmly against the grounding wire, the ground wire may not effectively contact the housing, which may lead to an unstable ground connection.

SUMMARY OF THE INVENTION

Hence there is a desire for a motor which can achieve a stable ground connection while avoiding deformation of the end cap.

Accordingly, in one aspect thereof, the present invention provides a brush motor comprising a stator and a rotor; the rotor comprises a shaft, a commutator and a rotor core fixed to the shaft, rotor windings wound around the rotor core and electrically connected to segments of the commutator; the stator comprises a housing with an open end, a brush assembly mounted in the open end and an end cap closing the open end; the brush assembly comprises a brush card, brush cages disposed on the brush card, at least one first brush and at least one second brush respectively mounted in the brush cages, terminals for connecting with an external power supply, power supply circuits connected between the terminals and the respective brushes, at least one grounding conductor fixed with the brush card and electrically connected to the power supply circuits, the grounding conductor includes a main portion fixed to the brush card and a tongue extending from the main portion, and having a free end arranged to resiliently bear against and make electrical contact with at least one of the end cap and the housing.

Preferably, the main portion of the grounding conductor is plate shaped and the tongue is bent into an arc.

Preferably, the grounding conductor is integrally connected with the brush card by insert molding.

Preferably, the terminals comprise a first terminal and a second terminal for connecting to a positive electrode and a negative electrode of the power supply, respectively; the power supply circuits comprise a first power supply circuit connected between the first terminal and the at least one first brush, and a second power supply circuit connected between the second terminal and the at least one second brush; the at least one grounding conductor comprises a first grounding conductor electrically connected to the first power supply circuit through a first capacitor.

Preferably, the at least one grounding conductor further comprises a second grounding conductor electrically connected to the second power supply circuit.

Preferably, the main portion of the second grounding conductor is electrically connected to the second power supply circuit through a conductor or a second capacitor.

Preferably, the brush card is mounted between the housing and the end cap, and the tongue of the grounding conductor is resiliently clamped between the end cap and the housing.

Preferably, the tongue comprises a bent portion arranged to be resiliently deformed to press the free end of the tongue against the end cap or the housing.

Preferably, the bent portion of the tongue is deformed by the end cap causing the free end of the tongue to contact the housing.

Alternatively, the bent portion of the tongue is deformed by the housing urging the free end of the tongue into contact with the end cap.

Preferably, the brush card comprises a plurality of protrusions extending towards the housing, the open end of the housing has cutouts corresponding to the protrusions, and the protrusions of the brush card are disposed in the cutouts of the housing.

Preferably, the open end of the housing comprises an outwardly flared edge, a circumferential edge of the end cap comprises an annular flange extending axially, and a free end of the annular flange comprises a plurality of connecting tabs extending toward the housing, and the annular flange of the end cap is located radially outside the edge of the housing, and distal ends of the connecting tabs are bent to bear against the edge of the housing.

In view of the foregoing, by using a resiliently deformable tongue clamping the tongue between the end cap and the motor housing, a reliable electrical connection between the grounding conductor and the housing can be established. This makes grounding of the motor more stable. In addition, the grounding conductor has a simple structure and is easy to fabricate and assemble.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
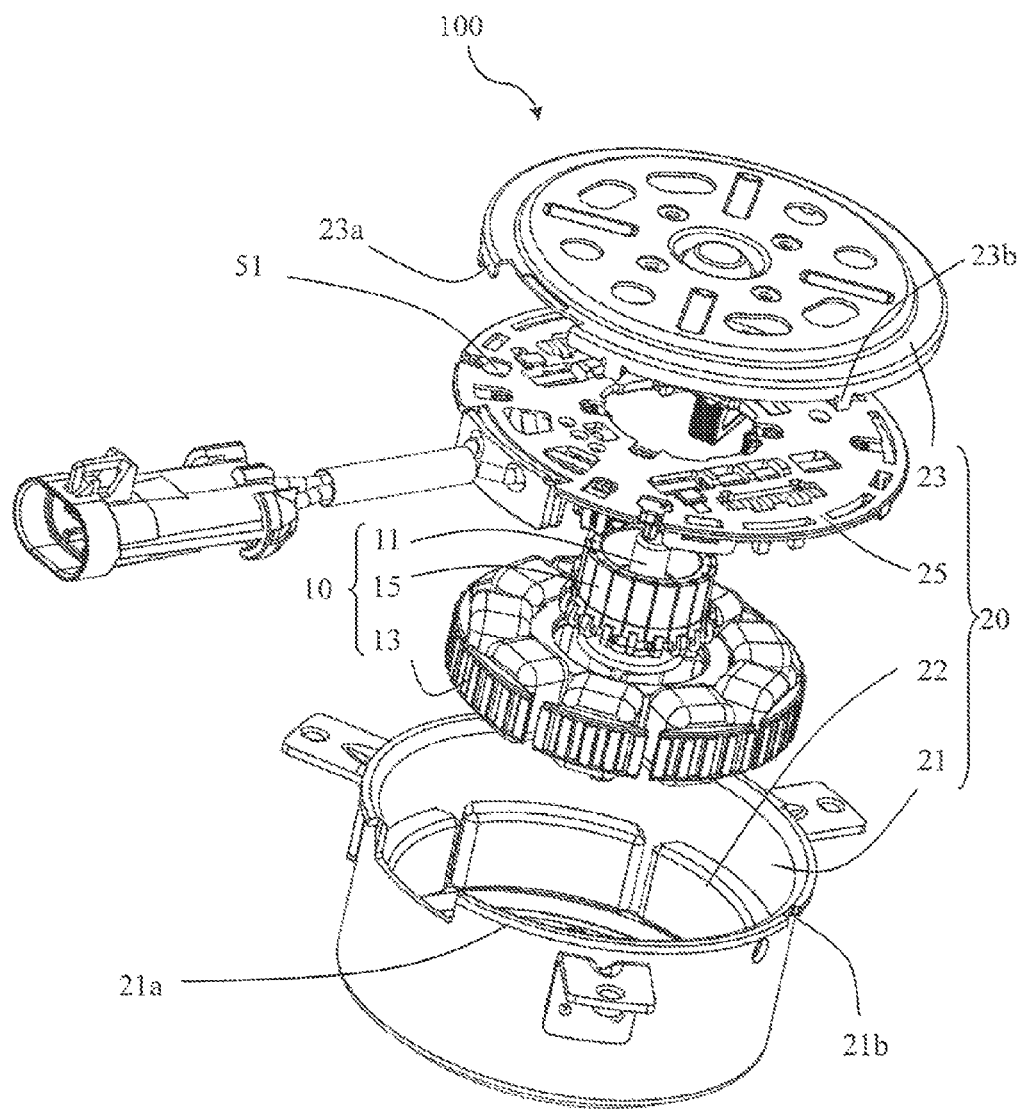
FIG. 1 is an exploded view of a brush direct current motor according to the preferred embodiment of the present invention.
Figure 2:
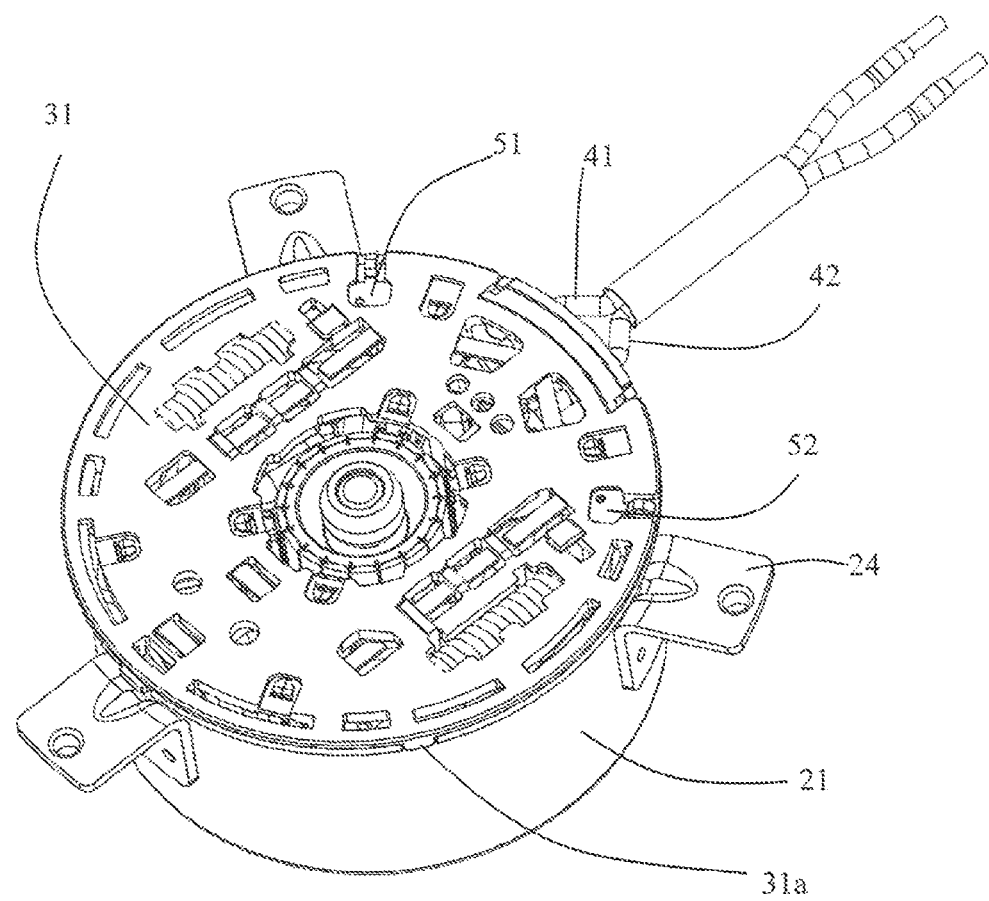
FIG. 2 shows the motor of FIG. 1, with an end cap removed.

FIG. 1 illustrates a brush type direct current motor 100 in accordance with the preferred embodiment of the present invention. The motor has a stator 20 and a rotor 10. The stator 20 includes a cylindrical housing 21 with an open end, a closed end, permanent magnets 22 mounted to an inner surface of the housing 21, and a brush assembly 25 and an end cap 23 mounted to the open end of the housing 21. The rotor 10 includes a shaft 11, a rotor core 13 and a commutator 15 fixed to the shaft 11, and rotor windings wound around the rotor core 13 and electrically connected with segments of the commutator 15.

Figure 8:
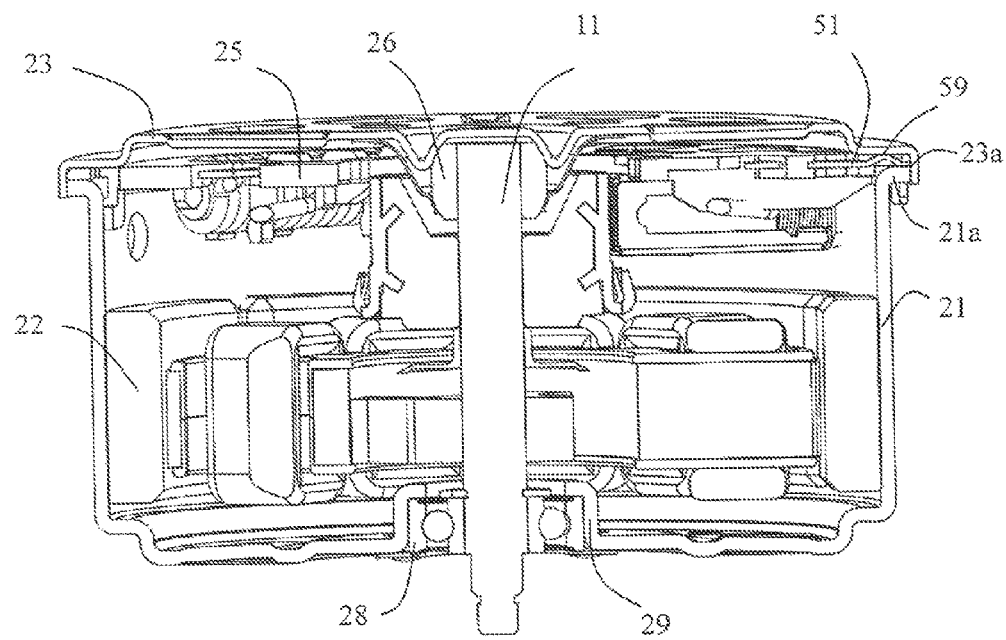
FIG. 8 is a sectional view of the motor of FIG. 1.

The housing 21 is made of a metal material with good electrical conductivity. Ideally, the material of the housing is magnetically conductive so that the housing forms a part of the magnetic flux return path of the stator. Preferably, an outer surface of the housing 21 is coated with a layer of insulating paint to increase resistance to corrosion. The housing 21 includes a bearing holder 29 formed in the closed end (FIG. 8). A bearing 28 is disposed in the bearing holder 29.

The brush assembly 25 is disposed at an inner side of the end cap 23. A bearing 26 is mounted on the end cap 23. The bearing 26 on the end cap 23 and the bearing 28 on the housing cooperatively support the shaft 11, allowing the rotor 10 to rotate relative to the stator 20.

The open end of the housing 21 has an outwardly flared edge 21a. An annular flange 23a extends axially from a circumferential periphery of the end cap 23, and a plurality of connecting tabs 23b extends from a free end of the annular flange 23a toward the housing 21. When the end cap 23 is placed on the housing 21, the annular flange 23a of the end cap 23 surrounds the edge 21a of the housing 21, and the connecting tabs 23b extend beyond the edge 21a of the housing. The end cap 23 is secured to the housing 21 by bending the connecting tabs 23b toward the housing 21 to bear against a bottom of the edge 21a.

Figure 3:
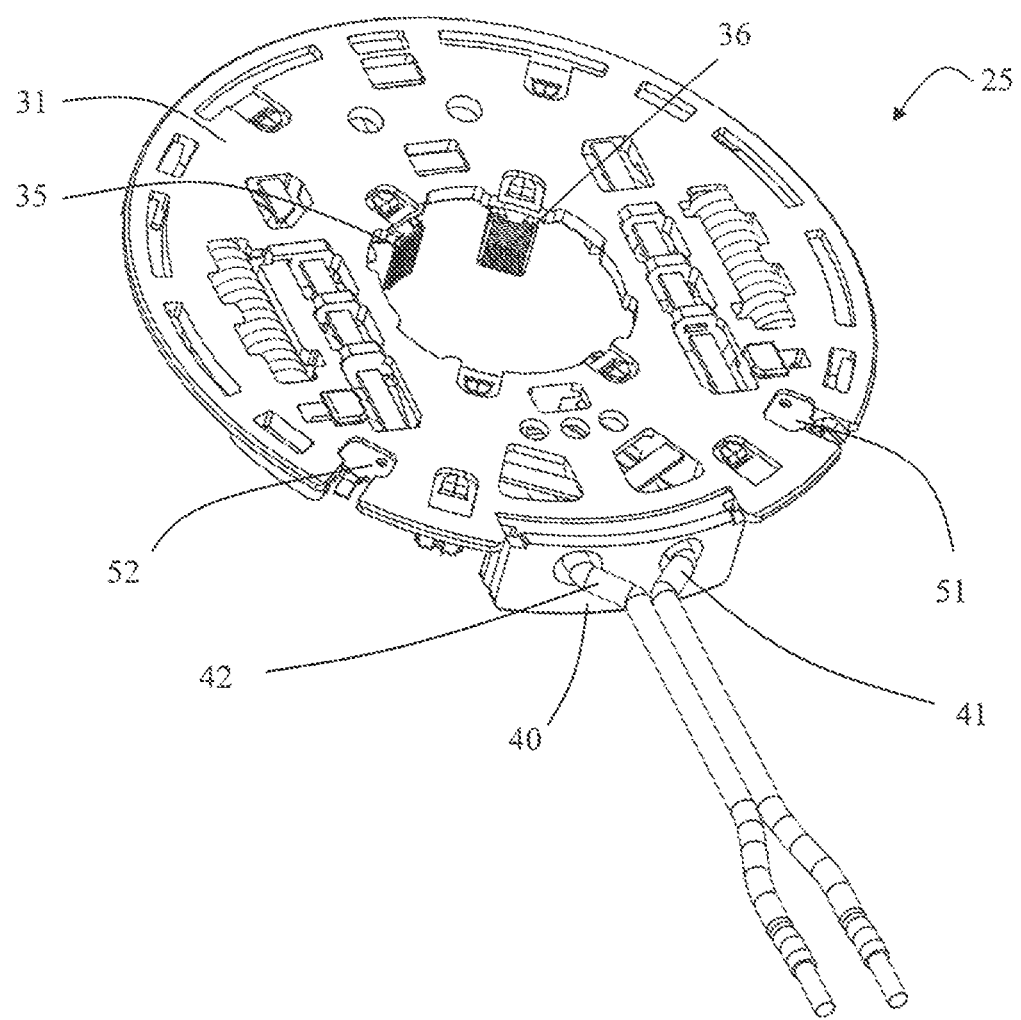
FIG. 3 and FIG. 4 illustrate a brush assembly of the motor of FIG. 1.
Figure 4:
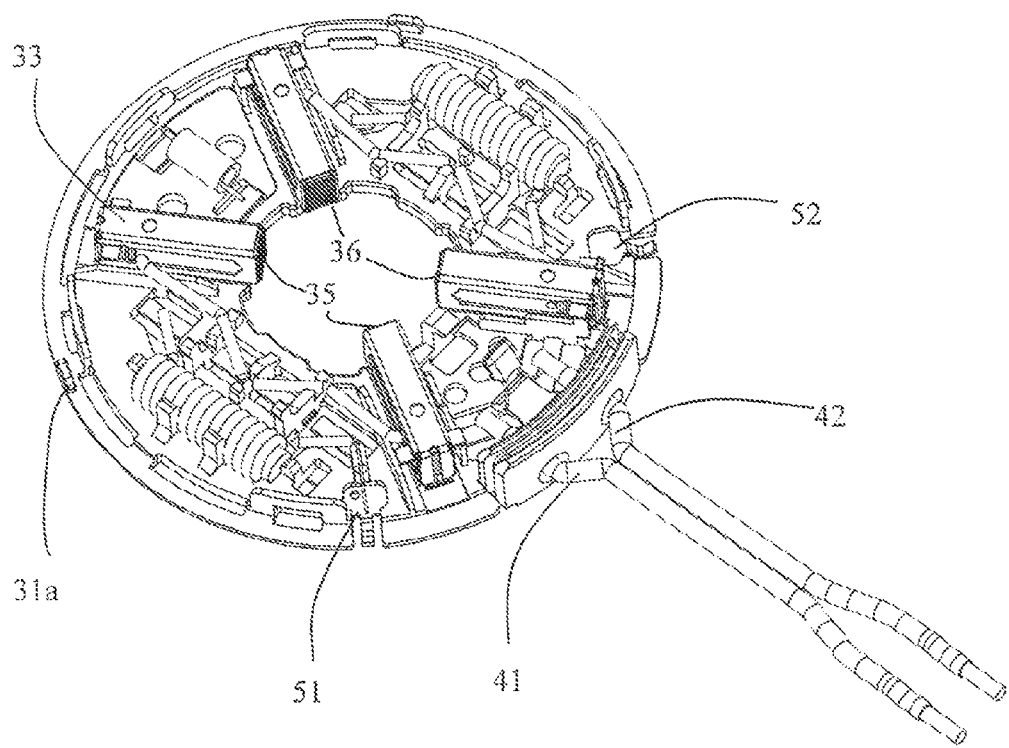

As shown in FIGS. 3, and 4, the brush assembly 25 includes an insulating support member or brush card 31, brush cages 33 disposed on the brush card 31, a first pair of brushes 35 and a second pair of brushes 36 mounted in their respective brush cages 33, a first power supply lead 41 and a second power supply lead 42 for connecting to an external power supply, a first power circuit connected in series between the first pair of brushes 35 and the first power supply lead 41, and a second power circuit connected in series between the second pair of brushes 36 and the second power supply lead 42. In this embodiment, the brush card 31 is generally plate-shaped. Preferably, the brush card 31 is fabricated by injection molding. The power supply leads pass through a rubber lead seal 40 which is fixed in a slot in the housing to support the leads. The two power supply leads form the terminals of the motor. In another embodiment the two leads may be replaced by rigid terminals to which a power supply can be connected.

Protrusions 31a protrude from a circumferential periphery of the brush card 31 toward the housing (FIG. 4). Cutouts 21b (FIG. 1) are formed in the edge of the open end of the housing 21, corresponding to the protrusions 31a. During assembly of the brush assembly 25 to the housing 21, the protrusions 31a are inserted into the respective cutouts 21b of the housing 21, thus locating the brush assembly 25 with respect to the housing 21. The engagement of the protrusions 31a in the cutouts 21b makes positioning of the brush card 31 easier and prevents undesirable rotation of the insulating support member 31 relative to the housing 21.

The brush assembly 25 further includes a first grounding conductor 51 and a second grounding conductor 52 mounted to the brush card 31. Preferably, the first and second grounding conductors 51, 52 are integrally formed with the brush card 31 by insert molding. In the present embodiment, the first grounding conductor 51 and the second grounding conductor 52 are separate and integrally formed metal pieces. It is to be understood that the first grounding conductor 51 or the second grounding conductor 52 may be formed by multiple separate pieces connected together.

The first grounding conductor 51 electrically connects the first power supply circuit to the housing 21 to achieve a ground connection. The second grounding conductor 52 electrically connects the second power supply circuit to the housing 21 to achieve a ground connection. The ground connection helps reduce the electromagnetic interference (EMI) of the motor to the surrounding environment. It is noted that, prior to assembly, the insulating paint on the portion of the housing 21 to be contacted by the first and second grounding conductors 51, 52 needs to be removed to ensure the electrical connection between the housing 21 and the first and second grounding conductors 51, 52.

Figure 5:
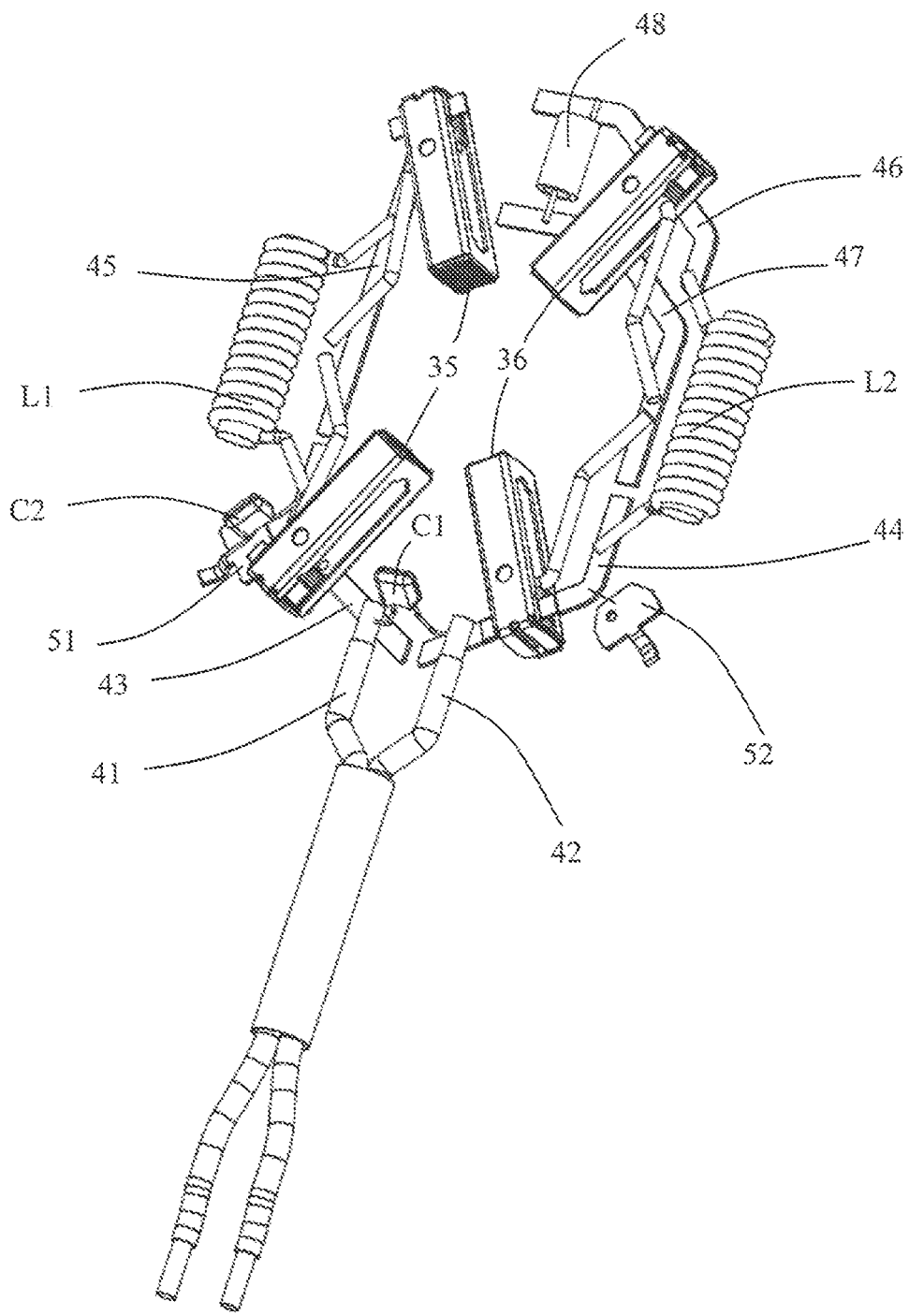
FIG. 5 illustrates the brush assembly of FIG. 3, with a brush card removed.

FIG. 5 illustrates the electrical components of the motor. A bridging capacitor C1 is connected between the two power supply leads 41, 42. In the present embodiment, the first power supply circuit mainly includes a first inductor L1. Specifically, the first power supply lead 41 is electrically connected to one end of the first inductor L1 through a conductor 43, and the other end of the first inductor L1 is electrically connected to a conductor 45. Both brushes of the first pair of brushes 35 are electrically connected to the conductor 45 and hence electrically connected to the first power supply lead 41. It is noted that the main function of the conductors 43, 45 is series-connecting the first power supply lead 41, the first inductor L1 and the first pair of brushes 35. Therefore, the conductors 43, 45 may vary in shape, length or number according to need.

Similarly, the second power supply circuit mainly includes a second inductor L2. Specifically, the second power supply lead 42 is electrically connected to one end of the second inductor L2 through a conductor 44, and the other end of the second inductor L2 is electrically connected to a conductor 46. The conductor 46 is electrically connected to a conductor 47 through an over temperature protection element 48. Both brushes of the second pair of brushes 36 are electrically connected to the conductor 47. It is noted that the main function of the conductors 44, 46, 47 is series-connecting the second power supply lead 42, the second inductor L2, the over temperature protection element 48 and the second pair of brushes 36. Therefore, the conductors 44, 47 may vary in shape, length or number according to need. Of course, over temperature protection element 48 and conductor 46 may be omitted if over temperature protection is not required.

The conductors 43, 44, 45, 46, 47 are conductors commonly used in brush assemblies, which are not an important aspect of the present invention. Therefore, further explanations as to the shape and mounting of these conductors are not made herein.

The first grounding conductor 51 acts to indirectly electrically connect the first power supply circuit to the housing 21 to achieve the grounding connection. The second grounding conductor 52 acts to directly or indirectly electrically connect the second power supply circuit to the housing 21 to achieve the grounding connection. In this embodiment, the first grounding conductor 51 is connected to the conductor 43 through a capacitor C2, and the second grounding conductor 52 is directly connected to the conductor 44 through another conductor such as a wire. It is noted that, in another embodiment, an additional capacitor may be added to connect the second grounding conductor 52 to the conductor 44 to suppress the EMI of the motor to the surrounding environment. It is to be understood that either the first or the second grounding conductor 52 may even be omitted to reduce cost in some embodiments.

The grounding conductors 51, 52 have substantially the same shape and, therefore, the shape of the grounding conductors is described below in connection with the first grounding conductor 51.

Figure 6:
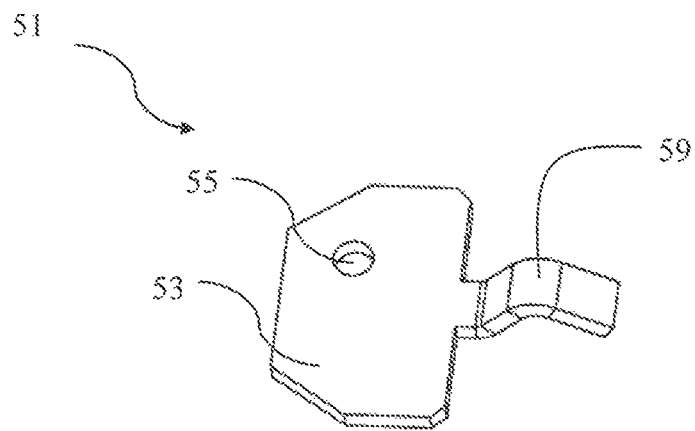
FIG. 6 illustrates a ground connector of the brush assembly of FIG. 3.
Figure 7:
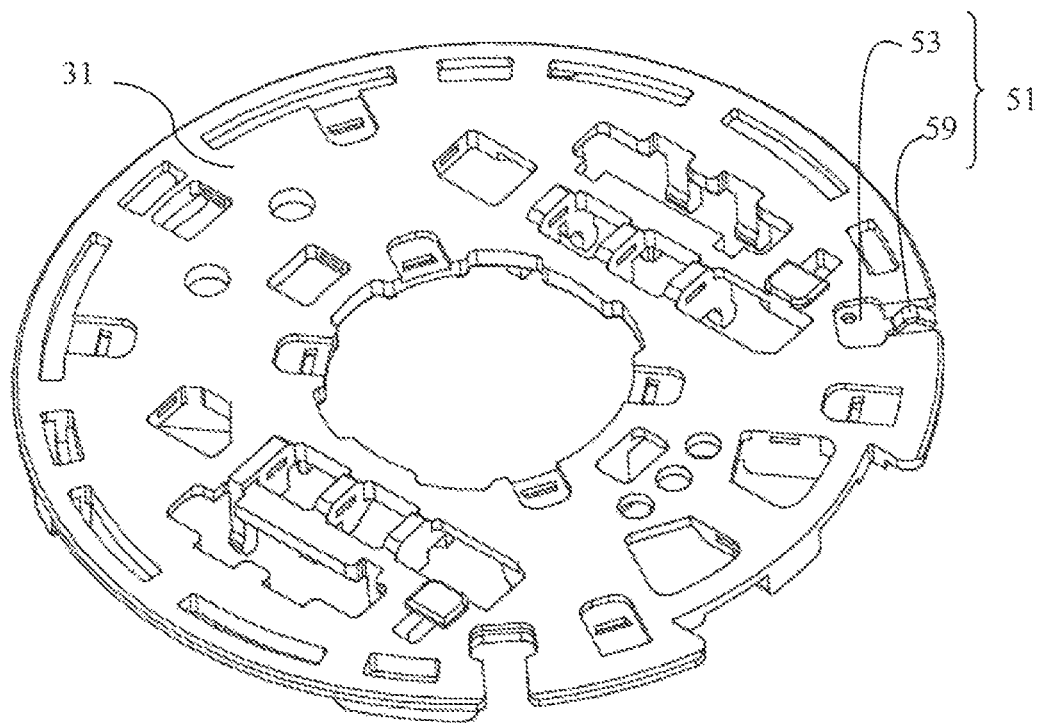
FIG. 7 illustrates the brush card of the brush assembly of FIG. 3.

FIG. 6 illustrates the first grounding conductor 51 in isolation. FIG. 7 shows the first grounding conductor fitted to the brush card 31. The grounding conductor 51 includes a main portion 53 and a tongue 59 extending from an edge of the main portion 53. The main portion 53 and the brush card 31 are fixed together. Preferably, in forming the brush card 31, part of the edge of the main portion 53 is embedded into the support member 31 so as to be fixed to the brush card 31. In addition, in the present embodiment, the main portion 53 is connected with the power supply circuit. Specifically, a pin of the conductor or a lead of a capacitor that is directly connected with the grounding conductor 51 is electrically connected with the main portion 53 by spot-welding. Preferably, the main portion 53 is substantially plate shaped. A hole 55 is provided in the main portion to assist orientating the grounding conductor during molding of the brush card.

The tongue 59 has one end connected to the plate shaped main body and the other end is free. The tongue extends from the edge of the main portion 53 towards the circumferential edge of the motor. Preferably, the tongue 59 is strip shaped. The middle of the tongue 59 arches up to form a bent portion with an inverted V shape or inverted U shape. During assembly, the arched-up portion of the tongue 59 is pressed by an inner surface of the end cap 23, such that the free end of the tongue 59 is more tightly clamped to the edge 21a of the housing 21 to establish a stable electrical connection. In order to achieve more intimate contact, preferably, the arched-up portion protrudes beyond a plane in which the main portion 53 is located. The grounding conductor 51 has a simple structure, is easy to fabricate and assemble, and is capable of achieving a stable ground connection for the motor 100.

Referring to FIG. 7, in this embodiment, the arched-up portion of the tongue 59 protrudes beyond a plane in which the brush card 31 is located to make the end cap press against the arched-up portion of the tongue 59, such that the distal end (free end) of the tongue 59 can be resiliently and reliably clamped to the housing of the motor.

Figure 9:
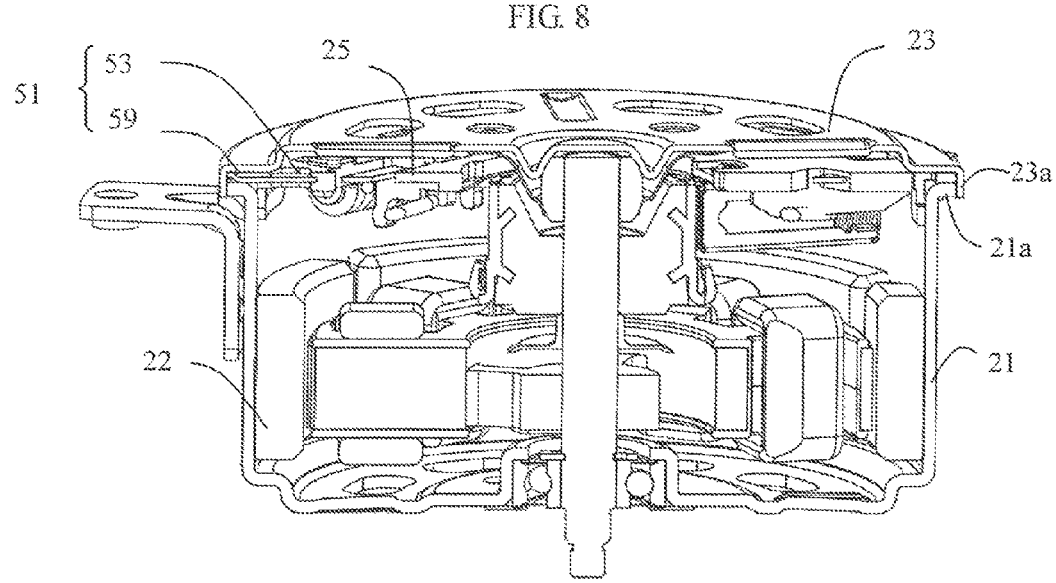
FIG. 9 is a sectional view of a brush motor according to a second embodiment of the present invention.

FIG. 9 illustrates a motor in accordance with another embodiment. The difference between this embodiment and the previous embodiment is that the tongue 59 bends in the opposite direction. Specifically, the grounding conductor 51 includes the main portion 53 and the tongue 59 extending from the edge of the main portion 53. The free end of the tongue 59 includes an oblique upward (toward the end cap) bent portion. During assembly, the free end of the tongue 59 is pressed by the inner surface of the end cap 23, such that the area of the tongue 59 from which the bent portion starts is tightly pressed to the housing 21 to establish stable electrical connection.

As described above, in the present invention, the power supply circuit of the brushes is electrically connected to the housing 21 through the grounding conductor 51 having the main portion 53 and the resilient tongue 59. Specifically, the resilient tongue 59 includes the bent portion. One of the bent portion and the free end of the tongue is pressed by the end cap 23 such that the other of the bent portion and the free end of the tongue is resiliently and reliably electrically connected to the housing 21. It is to be understood that the tongue can be electrically connected to the end cap 23 to further increase the reliability of the grounding connection.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush motor comprising a stator and a rotor;
the rotor comprises a shaft, a commutator and a rotor core fixed to the shaft, rotor windings wound around the rotor core and electrically connected to segments of the commutator;
the stator comprises a housing with an open end, a brush assembly mounted in the open end and an end cap closing the open end;
the brush assembly comprises a brush card, brush cages disposed on the brush card, at least one first brush and at least one second brush respectively mounted in the brush cages, terminals for connecting with an external power supply, power supply circuits connected between the terminals and the respective brushes, at least one grounding conductor fixed with the brush card and electrically connected to the power supply circuits, the grounding conductor includes a main portion fixed to the brush card and a tongue extending from the main portion, and having a free end arranged to resiliently bear against and make electrical contact with at least one of the end cap and the housing.

2. The motor of claim 1, wherein the main portion of the grounding conductor is plate shaped and the tongue is bent into an arc.

3. The motor of claim 1, wherein the grounding conductor is integrally connected with the brush card by insert molding.

4. The motor of claim 1, wherein the terminals comprise a first terminal and a second terminal for connecting to a positive electrode and a negative electrode of the power supply, respectively; the power supply circuits comprise a first power supply circuit connected between the first terminal and the at least one first brush, and a second power supply circuit connected between the second terminal and the at least one second brush; the at least one grounding conductor comprises a first grounding conductor electrically connected to the first power supply circuit through a first capacitor.

5. The motor of claim 4, wherein the at least one grounding conductor further comprises a second grounding conductor electrically connected to the second power supply circuit.

6. The motor of claim 5, wherein the main portion of the second grounding conductor is electrically connected to the second power supply circuit through a conductor or a second capacitor.

7. The motor of claim 1, wherein the brush card is mounted between the housing and the end cap, and the tongue of the grounding conductor is resiliently clamped between the end cap and the housing.

8. The motor of claim 1, wherein the tongue comprises a bent portion arranged to be resiliently deformed to press the free end of the tongue against the end cap or the housing.

9. The motor of claim 8, wherein the bent portion of the tongue is deformed by the end cap causing the free end of the tongue to contact the housing.

10. The motor of claim 8, wherein the bent portion of the tongue is deformed by the housing urging the free end of the tongue into contact with the end cap.

11. The motor of claim 1, wherein the brush card comprises a plurality of protrusions extending towards the housing, the open end of the housing has cutouts corresponding to the protrusions, and the protrusions of the brush card are disposed in the cutouts of the housing.

12. The motor of claim 1, wherein the open end of the housing comprises an outwardly flared edge, a circumferential edge of the end cap comprises an annular flange extending axially, and a free end of the annular flange comprises a plurality of connecting tabs extending toward the housing, and the annular flange of the end cap is located radially outside the edge of the housing, and distal ends of the connecting tabs are bent to bear against the edge of the housing.

* * * * *